L. L. STORY.
MILKING MACHINE.
APPLICATION FILED SEPT. 17, 1908.

927,896.

Patented July 13, 1909.
5 SHEETS—SHEET 1.

WITNESSES

INVENTOR
Leonard L. Story
BY
ATTORNEYS

L. L. STORY.
MILKING MACHINE.
APPLICATION FILED SEPT. 17, 1908.

927,896.

Patented July 13, 1909.
5 SHEETS—SHEET 2.

WITNESSES

INVENTOR
Leonard L. Story
BY
ATTORNEYS

L. L. STORY.
MILKING MACHINE.
APPLICATION FILED SEPT. 17, 1908.

927,896.

Patented July 13, 1909.
5 SHEETS—SHEET 3.

WITNESSES

INVENTOR
Leonard L. Story
BY
ATTORNEYS

L. L. STORY.
MILKING MACHINE.
APPLICATION FILED SEPT. 17, 1908.

927,896.

Patented July 13, 1909.
5 SHEETS—SHEET 4.

WITNESSES
F. D. Sweet
F. D. Ammen

INVENTOR
Leonard L. Story
BY
ATTORNEYS

UNITED STATES PATENT OFFICE.

LEONARD LEACH STORY, OF EAST FAIRFIELD, VERMONT.

MILKING-MACHINE.

No. 927,896.　　　　Specification of Letters Patent.　　　Patented July 13, 1909.

Application filed September 17, 1908. Serial No. 453,519.

*To all whom it may concern:*

Be it known that I, LEONARD L. STORY, a citizen of the United States, and a resident of East Fairfield, in the county of Franklin and State of Vermont, have invented a new and Improved Milking-Machine, of which the following is a full, clear, and exact description.

This invention relates to milking machines. The object of the invention is to produce a machine for this purpose which shall be of simple construction and which can be readily adjusted in position.

While the invention concerns itself with the general construction of the machine, it relates also to the construction of the teat cups and the manner of actuating them in the milking operation.

The invention contemplates the employment of a vacuum pump to assist in the milking.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Fig. 3 is an end elevation of the machine, certain parts being broken away; Fig. 6 is a perspective illustrating the device in practical use.

Figure 1:
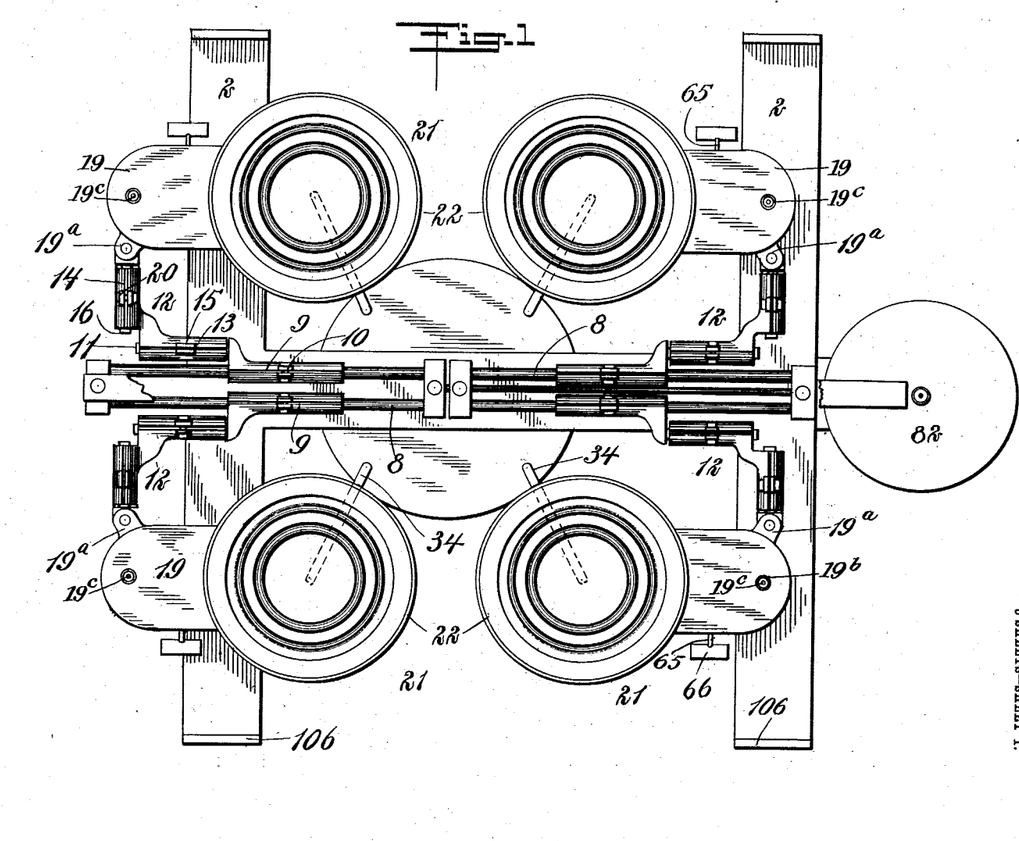
Figure 1 is a plan of a milking machine constructed according to my invention, certain parts being broken away.
Figure 2:
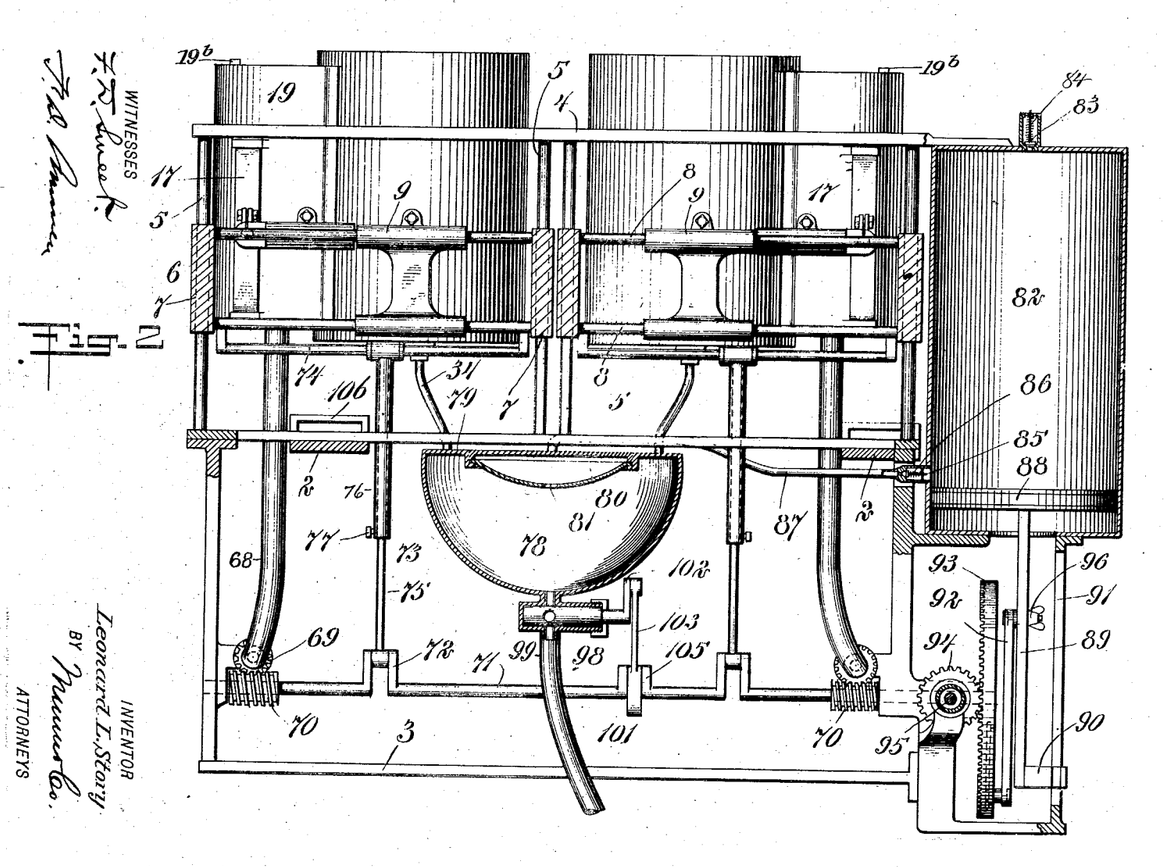
Fig. 2 is a longitudinal vertical section taken through 35 the machine, certain parts being broken away; this section is taken on the line 2—2 of Fig. 3.

Referring more particularly to the parts, and especially to Figs. 1 to 3, 1 represents the frame of the device, which comprises two cross bars 2, 2. Below these cross bars 2, 2 an under frame 3 is supported, and above the cross bars a super-frame 4 is supported. The super-frame 4 comprises vertically-disposed guide-stems 5, on which cross-heads 6 are adapted to slide in a vertical direction. Said cross-heads comprise sliding sleeves 7, which slide on the guide-stems, as indicated, and these sleeves are connected by parallel guide-bars 8. On the guide-bars 8 cup-holders 9 are adapted to slide. These cup-holders are in the form of split sleeves, as shown, adapted to slide freely or to be fixed by means of clamping-bolts 10 arranged as shown. These sleeves 9 are provided with pintles 11 which project laterally on the guide-bars 8, and to these pintles knuckles 12 are attached. These knuckles are in the form of two split sleeves 13 and 14, the sleeves 13 being loose to permit free movement, or clamped rigidly to the knuckles by means of clamping bolts 15, as indicated. The sleeves 14 are disposed at right angles to the guide-bars 8 and they are adapted to clamp pintles 16 respectively, which are formed with knuckle-forks 17, as indicated in Fig. 3. These knuckle-forks 17 are provided with ears 18 which are pivotally attached to ears 19ª which project laterally from the cam boxes 19 of the teat cups. The sleeves 14 are split like the sleeves 13, and are adapted to move freely or be clamped rigidly in position by means of clamping bolts 20, as shown. The cam boxes 19 are formed on the sides of the cups 21 which are arranged as shown in Fig. 1. The construction of these cups is very clearly shown in Figs. 4 and 5. Each cup comprises a substantially cylindrical case 22 which is provided at its upper end with an inwardly-projecting annular flange 23 and an integral head 24 at the lower end. This head 24 is formed with a threaded nipple 25 and the flange 23 is depressed, as shown, to enable a threaded neck 26 to be formed in the end of the case therebeyond. Supported centrally within the case I provide a sleeve 27 of rubber, or similar material. The body of this sleeve is of substantially cylindrical form. When mounted in the teat-cup its wall is pressed from the exterior so as to form sections 28, which are of successively smaller diameter in a downward direction. At the lower end the sleeve 27 is formed with a laterally-projecting lip which is provided with an integral ring 29, said ring being seated in a groove 30 formed in the end of the nipple 25. This ring 29 and the lip upon which it is formed, are clamped rigidly in position by means of a cap 31 which screws onto the nipple 25, as shown, said cap having an annular liner or washer 32 on its inner side which is grooved to receive the ring, as indicated. The cap 31 is itself provided with a threaded nipple 33, to which a flexible hose 34 is attached. The upper end of the sleeve 27 is formed with an integral ring or lip 35, and from this lip 35 a diaphragm or head 36 extends. This head is provided with a plurality of concentric rings 37, and the outermost of these rings is clamped under a keeper-ring 38, which screws into the threaded neck 26 and seats on a washer 38ª, which clamps the head 36. In this way the cup is supported in position.

Figures 5, 7:
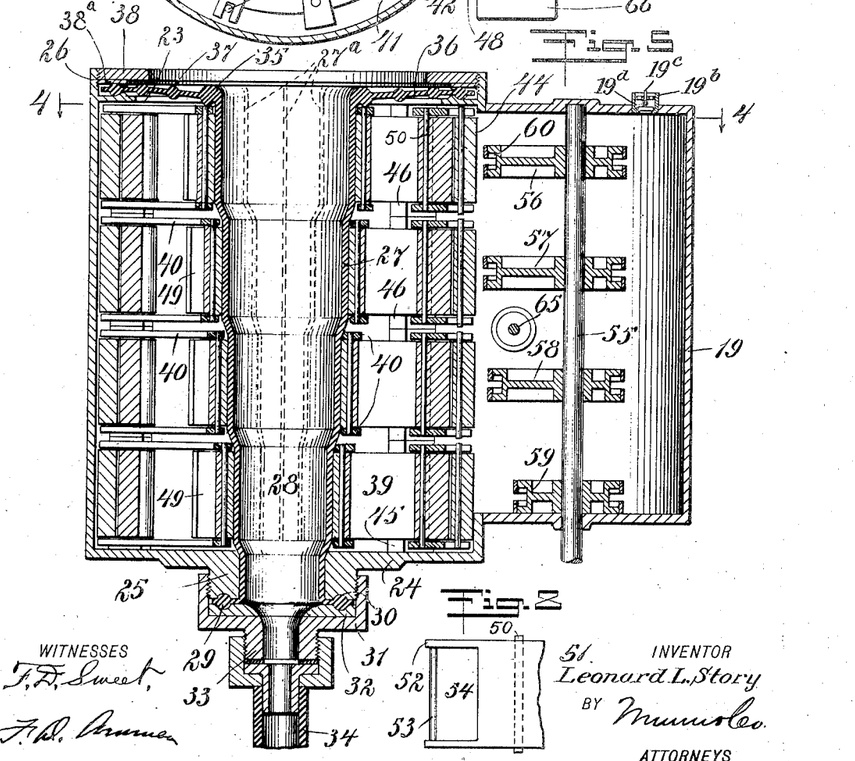
Fig. 5 is a vertical section taken on the line 5—5 of Fig. 4.
Fig. 7 is a side elevation showing the lower end of a link which operates a valve or cock which leads from the milk receiver to the receptacle or milk bucket.

Within the case 22 I provide a plurality of rings 39, and these rings are arranged one above the other and correspond to the different sections 28 of the cup. These rings 39 constitute lever-holders, for upon their upper and lower faces levers 40 are pivotally attached, said levers having tails 41 which project radially beyond the edges of the rings and are formed with slots 42. In the slots 42 pins 43 are received, and these pins project outwardly from the upper and lower faces of cam rings 44. These cam-rings are of larger diameter than the rings 39 and they are arranged concentrically and corresponding therewith, so that each lever-carrying ring 39 is surrounded by a cam-ring. The lowermost of the rings 39 is provided with lugs 45, which seat on the bottom-head 24, as shown in Fig. 5. Similar lugs 46 are provided on the adjacent faces of the rings 39, which come together, as shown, in such a way that the upper rings seat upon and are supported upon the lower rings.

Figure 4:
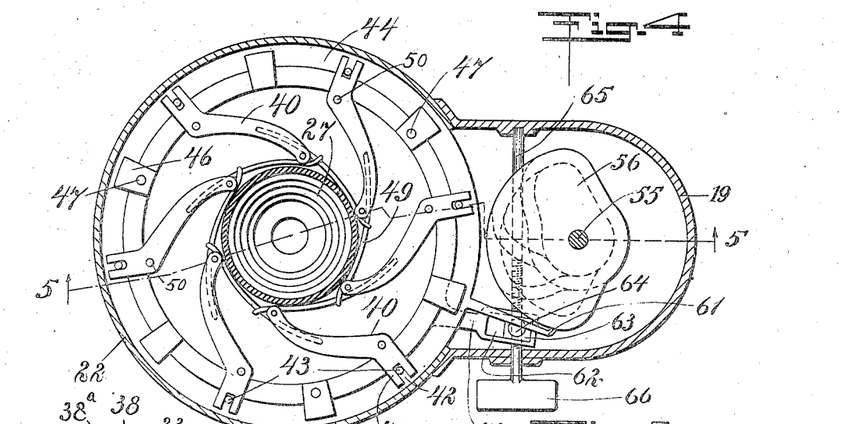
Fig. 4 is a horizontal section taken through 40 the upper part of one of the teat cups and illustrating the operating mechanism for the same; this section is taken on the line 4—4 of Fig. 5.

In order to prevent the rings from shifting upon each other, dowel pins 47 are employed at the lugs 46. From this arrangement it should be understood that the rings 39 may be shifted bodily in a rotary direction. For this purpose one of the rings 39 is provided with an outwardly-projecting arm 48 which extends into the cam box, as indicated in Fig. 4. This arm is for the purpose of enabling the rings 39 to be adjusted. The details of the mechanism for accomplishing this adjustment will be described more fully hereinafter. The inner arms or long arms of the levers 40 are curved as shown, and extend to a point near the side wall of the sleeve 27. At this point, to each lever a curved plate 49 is pivotally attached. The bodies of these plates are slightly curved, as shown, and lie tangentially around the sleeve 27. Each plate 49 extends a short distance beyond the pivot pin 50 which attaches it to its lever so as to form a short projecting tail 51. These tails 51 are bifurcated so as to present forks 52 which are connected by vertical guide pins 53. In this way guide slots or openings 54 are formed in the tail end of each plate. The plates are arranged around the sleeve in such a way that the body of each plate passes through the guide opening or slot 54 in the next adjacent plate, as indicated in Fig. 4. From this arrangement it should be understood that if the levers 40 are actuated so as to advance their inner ends inwardly, the plates 49 will press the sides of the sleeve 27 so as to contract it. When this movement takes place, the plates 49 slide freely through the guide openings 54, as will be readily understood. In this way the plates 49 are made to form a collapsible shell about the sleeve, and these shells correspond to the different sections 28, or diameters of the sleeve.

I provide means for operating the levers as suggested through the medium of the rings 44. For this purpose each cam box is provided with a vertical shaft 55 and each shaft is provided with cams 56, 57, 58, and 59, as shown in Fig. 5. These cams are provided with grooves 60 in the faces thereof, and these grooves receive the ends of arms 61 respectively, which project out from the rings 44, as shown. It should be understood that when the machine is in operation, the shaft 55 rotates the upper cam 56, which will operate first to shift the arm 61 which connects with it. This will give a slightly rotary movement to the uppermost of the rings 44, and this will shift the inner ends of the levers 40 of this section of the sleeve inwardly. In this way the uppermost section of the sleeve becomes contracted; immediately, however, the cam 56 operates, the cam 57 actuates its corresponding section of the sleeve in the same manner, so that the sections of the sleeve become contracted successively from the upper end downwardly. This simulates the action of the fingers in milking, for the cams hold the sleeve sections 28 contracted until the lowest one of all has been contracted, then they liberate the sections all in unison.

In order to adjust the normal position of the levers 40 so that the sleeve 27 will have a normally increased or reduced diameter, I provide mechanism in connection with the arm 48. For this purpose the arm 48 is formed with an enlarged guide opening 62 in the end thereof, and in this guide opening slides a block 63. This block has a swivel pin 64, which is threaded transversely to receive a transversely-disposed adjusting screw 65 which passes in a horizontal position through the cam box, as indicated. This adjusting screw 65 is provided with a flat head 66 outside of the cam box, which enables it to be rotated in making adjustments. Evidently when the screw is rotated the block 63 will be moved in or out and this will shift the arm 48. This shifts the rings 39 which carry the pivot pins of the levers 40. This of course adjusts the normal position of the levers and adjusts the diameter of the shells or contracting rings which the plates 49 form around the sections of the sleeve.

In order to drive the cam shaft 55, I provide two flexible shafts 67 which extend downwardly in U form, as indicated in Fig. 3, the ends of the shafts being attached to the cam shaft as indicated. These flexible shafts are suitably inclosed in tubular sheaths 68 and near their middle points they are provided with worm wheels 69. These worm wheels mesh with worms 70 which are carried upon the main shaft 71 which extends longitudinally of the frame, as shown, so that when the shaft 71 is rotated the cam shaft will also rotate. The shaft 71 is provided with cranks 72 to which connecting rods 73 are attached, the upper ends of the said connecting rods being pivotally attached to wrist bars 74 carried by the lower ends of the cross heads 6 aforesaid. The connecting rods 73 are formed in two sections, the lower sections 75 being in the form of stems which are received in the bore of the tubular upper sections 76. The upper sections 76 are provided with set screws 77 for clamping the stems rigidly in position, as will be readily understood. In this way the length of the connecting rod 73 is made adjustable.

In a central position with respect to the cups 21, there is provided a receiver 78 for the milk. This receiver is in the form of a hemispherical shell having a flat head or cover 79. Through the head 79 the cups 21 are connected with the receiver 78 by means of the flexible hose 34 referred to above. In the upper portion of the receiver 78 a dish-shaped guard-plate 80 is provided. The edges of this guard-plate 80 are supported just beneath the cover 79, and at its middle point or bottom it is provided with an opening 81, which communicates with the interior of the receiver. At one side of the machine, as indicated in Fig. 2, there is provided a vacuum pump 82, which consists simply of a cylinder disposed in a vertical position, having an outlet check valve 83 at its upper end which is actuated toward its seat by a spring 84, as shown. Near the lower end of the cylinder an inlet-check-valve 85 is provided, which is normally held on its seat by a spring 86. From the valve 85 a tube 87 extends over to the receiver 78 and passes through the head 79, so as to communicate with the space cut off by the guard-plate 80. This space constitutes a vacuum cup, and its operation will be more fully explained hereinafter. In the cylinder 82 a piston 88 reciprocates, said piston being provided with a guide-stem 89 having a cross head 90 formed thereupon, sliding on guide-bars 91, as indicated. To the guide-stem 89 a connecting-rod 92 is attached, the other end of said connecting rod being attached to a bevel gear wheel 93. This bevel gear wheel 93 is rigidly attached to the shaft 71, as indicated, and is adapted to be rotated by means of a bevel pinion 94 carried upon a driving shaft 95 arranged as indicated. The upper end of the connecting rod 92 is attached to the guide-stem 89 by means of a bolt.

Figure 6:
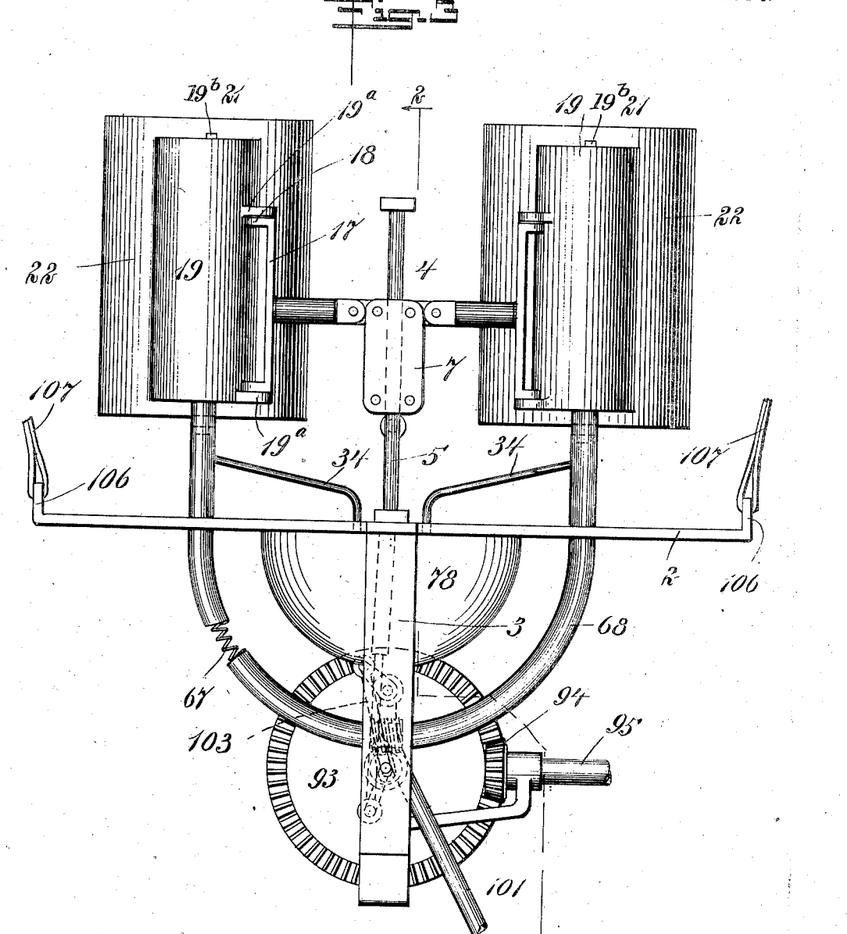
Figure 7:
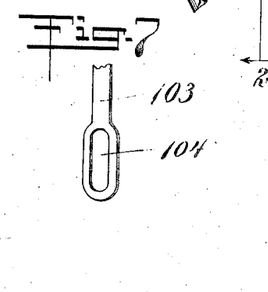
Figure 8:
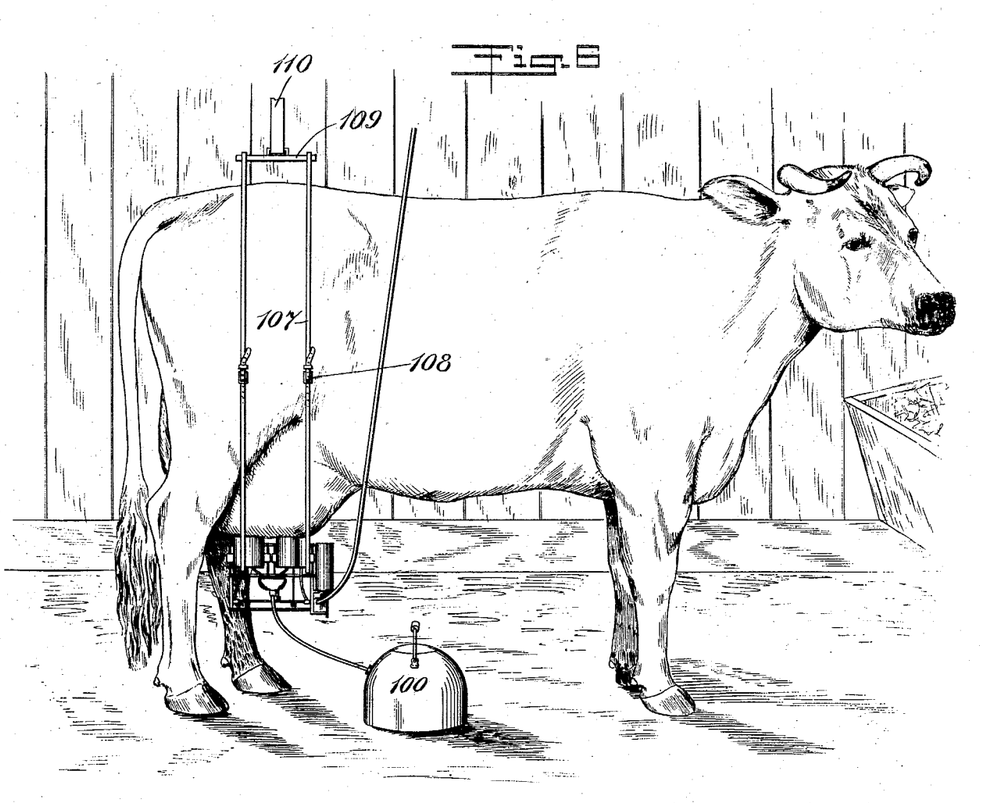
Fig. 8 is an elevation showing the inner end of one of the plates, a plurality of which are employed in connection with each teat cup, as will be described more fully hereinafter.

At the bottom of the milk receiver 78 a stop cock 98 is provided, having a plug 99 which is adapted to be rotated into one position to open communication from the receiver to the milk receptacle 100 through the medium of a hose 101. In the other position of the plug communication is cut off, and this is the position of the plug when the vacuum pump is in operation. In order to open and close this stop cock the plug 99 is provided with a crank 102, and to this crank a link 103 is pivotally attached; the lower end of this link 103 is formed with a slot 104, as shown in Fig. 7, and through this slot passes the wrist pin of a crank 105 formed on the shaft 71. This slot 104 coöperates with the crank 105 to open or close the stop cock 98 periodically at the end of each stroke of the crank 105. At the ends of the cross bars 2, 2, stirrups 106 are provided through which the ends of supporting straps 107 are passed in loops, as shown. These straps pass down the sides of the cow at the flank, as indicated in Fig. 6, and are provided with adjusting buckles 108, as shown. The upper end of the strap is attached to a supporting plate 109 disposed horizontally above the cow's rump and supported on elastic straps 110 from the ceiling or stable wall.

The general mode of operation of the machine will now be described: The cups 21 by means of the knuckles 12 may be adjusted into any position desired. By sliding the knuckles inwardly toward the middle point of the frame, the distance between the cups measured longitudinally of the frame may be adjusted. By rotating the cups on the knuckle forks 17 the cups may be brought inwardly toward the longitudinal axis of the frame, as will be readily understood. The sleeves 13 and 14 of the knuckles enable any desired angular adjustment of the cups to be made, and by means of the clamping bolts the cups may then be secured rigidly in position. The device is then applied in a proper position and adjusted by means of the straps 107. In adjusting the cups to the cow's udder, the connecting rods 73 may be lengthened or shortened as desired and made rigid by the set screws 77. As the shaft 71 rotates, the uppermost cams 56 in the cam box actuate the levers 40 of the uppermost section of the sleeve 27 so as to contract them around the cow's teat, the other cams then come into operation with a similar effect and at the same time the crank 72 moving downwardly begins to depress the cross heads 6. In this way the teat is not only compressed progressively from the nipple point downward, but it is pulled downwardly so that the hand milking movement is very exactly simulated. As the shaft rotates, the piston 88 also moves downwardly and this produces a partial vacuum in the vacuum pump 82 above the piston. As soon as the piston passes the valve 85, the effect of the partial vacuum is communicated to the receiver 78. This takes place immediately after the closing movement of the uppermost of the plates 49 actuated by the cam 56. During the time that the piston 88 is below the valve 85, the stop cock 98 is held closed so that there is no danger of the partial vacuum being "broken" by the admission of air from the tube 101.

The vacuum cup formed above the guard plate 80 is useful in diffusing the effect of the vacuum and in preventing any tendency of the draft created through the milk tube 34 to become unequal; in other words the guard plate operates as an equalizer so that a substantially equal suction will be produced in all the milk tubes. It also prevents the milk from being slopped into the air tubes 87. The flexible shafts 67 of course permit the cups to be readily adjusted as described. The flexible diaphragm 36 which forms the upper end of the sleeve 27 permits the sleeve to spread in contracting and expanding, as will be readily understood. The ring 37 formed in the diaphragm head 36 gives the head a certain amount of stiffness and assists in returning it to its normal position.

Attention is called to the fact that by reason of the presence of this ring 37 the head or diaphragm 36 is divided into three or more annular expanding portions which expand and contract when the sleeve is in operation. Extending downwardly, embedded in the wall of the sleeve, I provide a plurality of non-elastic cords 27ª. These do not extend throughout the entire length of the sleeve, but reach to the point near the lower end, as indicated. These cords prevent an elongation of the sleeve from taking place, but at the same time the lower end of the sleeve is left unrestricted and it can elongate as may be necessary to adapt itself to the movements of the lower end of the sleeve in milking. The rings 35 and 37 tend by contracting, to counteract the pull exerted by the diaphragm and by resting on top of the uppermost levers, they tend to support the diaphragm against inward collapse under the vacuum.

The arms 61 are resilient and will spring or give slightly in operation; in this way, they may prevent the rings 44 from receiving the entire amount of movement received by the arms 61.

The cam boxes 19 are provided with exhaust nipples 19$^b$ having outwardly opening check valves 19$^c$ which are held on their seats by springs 19$^d$. To these exhaust nipples the intake tube of an air pump may be attached to exhaust the air from the cam boxes and produce a partial vacuum within them. This partial vacuum is useful in assisting to restore the teat cups to their normal condition after they have been squeezed. In this connection attention is called to the atmospheric pressure within them which tends to force their walls outwardly.

Having thus described my invention, I claim as new and desire to secure by Letters Patent,—

1. In a milking machine, in combination, a frame, a plurality of cups mounted thereupon, means for adjusting the position of said cups upon said frame, said cups having collapsible sleeves therein, means for contracting said sleeves in sections and progressively downward, and means for drawing said cups downwardly.

2. In a milking machine, in combination, a frame, cross heads guided thereupon, a plurality of cups mounted on said cross heads and having contractible sleeves, members engaging the outer sides of said sleeves, means for contracting said sleeves, and means for reciprocating said cross heads.

3. In a milking machine, in combination, a frame, cross heads guided thereupon, a plurality of cups mounted on said cross heads and having contractible sleeves, means for contracting said sleeves, means for reciprocating said cross heads, a crank shaft in said frame, connecting rods connecting said crank shaft with said cross heads, and means for adjusting the length of said connecting rods.

4. In a milking machine, in combination, a frame, a plurality of cups adjustably mounted thereupon and having a contractible sleeve therein, means for contracting said sleeve, flexible shafts for actuating said last means, and a main shaft for actuating said flexible shafts.

5. In a milking machine, in combination, a frame, cross heads having guide bars mounted thereupon, cup holders adjustably mounted on said guide bars, cups adjustably carried by said cup holders, and means for reciprocating said cross heads.

6. In a milking machine, in combination, a frame, cross heads sliding on said frame and having horizontally disposed guide bars, cup holders sliding on said guide bars and adapted to be secured rigidly thereupon, cups corresponding to said cup holders, and means for adjustably securing all of said cups respectively upon said cup holders.

7. In a milking machine, in combination, a frame, a plurality of cups adjustably mounted thereupon, a receiver, hose connecting said cups with said receiver, a vacuum pump connected with said receiver, said cups having contractible sleeves therein, means for contracting said sleeves, a shaft actuating said last means, and means for actuating said pump from said shaft.

8. In a milking machine, in combination, a frame, a plurality of cups having contractible sleeves, means for contracting said sleeves, a receiver having an outlet, a stop-cock at said outlet, means for producing a partial vacuum in said receiver, means for mechanically closing said stop-cock when said partial vacuum is produced, and for opening said stop-cock after producing said partial vacuum, hose connecting said sleeves with said receiver, and a receptacle for the milk connected with said outlet.

9. In a milking machine, in combination, a frame, a plurality of cups having contractible sleeves mounted upon said frame, a receiver, tubes connecting said cups with said receiver, a vacuum pump connected with said receiver, means for contracting said sleeves, a shaft actuating the same, means for actuating said vacuum pump from said shaft, a stop cock leading from said receiver, and means for opening and closing said stop cock actuated by said shaft.

10. In a milking machine, in combination, a frame, cups carried thereby and having contractible sleeves, mechanisms for actuating said contractible sleeves, flexible shafts for actuating said mechanisms, a main shaft mounted in said frame, means for rotating said flexible shafts from said main shaft, and means for adjusting said cups.

11. In a milking machine, in combination, a frame, cross heads guided thereupon, cup holders adjustably mounted on said cross heads, cups, a plurality of adjustable knuckles connecting said cups with said cup holders, and means for actuating said cross heads.

12. In a milking machine, a cup having contractible sleeves, contractible shells formed of plates disposed around said sleeves, and means for contracting said shells.

13. In a milking machine, a cup having a contractible sleeve, a plurality of shells disposed along said sleeve and formed of plates engaging the sides of said sleeve, and means for actuating said plates to contract the wall of said sleeve from the upper end thereof downwardly.

14. In a milking machine, a cup having a contractible sleeve with a diaphragm head extending laterally therefrom at the upper end of said sleeve, and means for contracting the wall of said sleeve in sections.

15. In a milking machine, a cup having a contractible sleeve, a plurality of plates pivotally mounted around the wall of said sleeve and interlocking with each other to form a contractible shell, and means for forcing said plates inwardly to reduce the dimensions of said shell, and contract said sleeve.

16. In a milking machine, a cup having a contractible sleeve, a plurality of levers projecting inwardly toward said sleeve, a plurality of plates pivotally mounted on said levers and engaging the wall of said sleeve to contract the same, and means for actuating said levers simultaneously to force said plates inwardly against the wall of said sleeve.

17. In a milking machine, a cup having a contractible sleeve, a plurality of levers projecting inwardly toward said sleeve, a plurality of plates pivotally mounted on said levers, means for guiding said plates one upon the other so as to form a contractible shell about said sleeve, and means for actuating said levers simultaneously to contract said shell.

18. In a milking machine, a cup having a contractible sleeve, a plurality of members projecting inwardly toward said sleeve, plates pivotally mounted on said members having tails with guide openings, said plates being arranged so that each plate passes through the guide opening of an adjacent plate, and means for forcing said members inwardly to contract said plates on said sleeve, said guide openings affording means for guiding said plates when moving inwardly to contract said sleeve.

19. In a milking machine, a cup having a contractible sleeve, a plurality of rings mounted in said cup, a plurality of levers carried by said rings, means actuated by said levers for contracting said sleeve, and a plurality of rings engaging said levers, and means for actuating said last rings in succession.

20. In a milking machine, a cup having a contractible sleeve, a plurality of rings mounted in said cup, a plurality of levers carried by said rings, means actuated by said levers for contracting said sleeve, a plurality of rings engaging said levers, means for actuating said last rings in succession, and means for adjusting the position of said first rings to change the normal diameter of said sleeve.

21. In a milking machine, a cup having a contractible sleeve, mechanisms mounted in said cup and adapted to contract said sleeve in sections, means for actuating said mechanisms in succession, and means for adjusting said mechanisms.

22. In a milking machine, a cup having a contractible sleeve, a ring therein, a plurality of levers carried by said ring, plates carried by said levers and engaging the wall of said sleeve to contract the same, a cam ring engaging said levers to actuate the same, and a cam actuating said cam ring to move said levers.

23. In a milking machine, a cup having a contractible sleeve, a plurality of contractible shells formed around said sleeve, a plurality of cam rings, mechanisms actuated by said cam rings for contracting said shells, and a plurality of cams actuating said cam rings.

24. In a milking machine, a cup having a contractible sleeve, a plurality of rings, levers carried by said rings, plates carried by said levers and forming a contractible shell around said sleeve, said rings being connected so as to move in unison, an arm projecting from said rings, an adjusting screw for adjusting the position of said arm, a plurality of cam rings engaging said levers to actuate the same, and a plurality of cams respectively actuating said cam rings.

25. In a milking machine, a contractible sleeve having non-elastic members extending longitudinally thereof, and contractible rings surrounding said sleeve and contracting the same in sections.

26. In a milking machine, a contractible sleeve having non-elastic members extending longitudinally thereof contractible rings surrounding said sleeve and contracting the same in sections, said non-elastic members terminating near the lower end of said sleeve, and means for securing the lower end of said sleeve.

27. In a milking machine, in combination, a contractible sleeve, a case in which said sleeve is mounted, a valve in the wall of said case through which the air within said case may be withdrawn, and means surrounding said sleeve for contracting the same.

In testimony whereof I have signed my name to this specification in the presence of two subscribing witnesses.

LEONARD LEACH STORY.

Witnesses:
R. L. SOULE,
W. S. SOULE.